(12) United States Patent
Shuttleworth et al.

(10) Patent No.: US 7,503,424 B2
(45) Date of Patent: Mar. 17, 2009

(54) VEHICLE CAB NOISE SUPPRESSING SYSTEM

(75) Inventors: Adam Joe Shuttleworth, Denver, IA (US); Jeffrey John Girard, Cedar Falls, IA (US); Paul Thomas Bruss, Cedar Falls, IA (US); James Reginald Byrd, Cedar Falls, IA (US); Jason Michael Edgington, Cedar Falls, IA (US); Loren Avan DeVries, Bettendorf, IA (US)

(73) Assignee: Deere & Company, Moline, IL (US)

( * ) Notice: Subject to any disclaimer, the term of this patent is extended or adjusted under 35 U.S.C. 154(b) by 428 days.

(21) Appl. No.: 11/316,041

(22) Filed: Dec. 22, 2005

(65) Prior Publication Data

US 2007/0144827 A1 Jun. 28, 2007

(51) Int. Cl.
 *G10K 11/172* (2006.01)
(52) U.S. Cl. ................. 181/210; 181/284; 181/290; 181/293; 296/39.3; 296/211; 296/214
(58) Field of Classification Search ............... 181/210, 181/284, 290, 293; 296/39.3, 211, 214
See application file for complete search history.

(56) References Cited

U.S. PATENT DOCUMENTS

| | | | | |
|---|---|---|---|---|
| 4,013,302 A | | 3/1977 | Oswald | 280/154.5 |
| 4,782,913 A | | 11/1988 | Hoffmann et al. | 181/286 |
| 5,681,072 A | * | 10/1997 | Stricker | 296/39.3 |
| 6,062,635 A | * | 5/2000 | Learman et al. | 296/208 |
| 6,290,022 B1 | * | 9/2001 | Wolf et al. | 181/292 |
| 6,315,354 B1 | * | 11/2001 | Tani et al. | 296/208 |
| 6,322,136 B2 | * | 11/2001 | Boyce et al. | 296/214 |
| 6,517,147 B2 | * | 2/2003 | Grimm | 296/210 |
| 6,685,262 B1 | * | 2/2004 | Tiesler et al. | 296/214 |
| 6,780,097 B2 | * | 8/2004 | Shuttleworth et al. | 454/136 |
| 6,899,381 B1 | * | 5/2005 | Fero et al. | 296/214 |
| 6,951,264 B2 | * | 10/2005 | Byma et al. | 181/286 |
| 2005/0098379 A1 | * | 5/2005 | Sato et al. | 181/293 |
| 2005/0133302 A1 | * | 6/2005 | Pfaffelhuber et al. | 181/293 |
| 2005/0217933 A1 | * | 10/2005 | Sung Young et al. | 181/290 |

FOREIGN PATENT DOCUMENTS

| | | |
|---|---|---|
| DE | 19841975 | 3/2000 |
| DE | 100 25 078 | 11/2001 |
| DE | 10 2004 016 689 | 10/2005 |
| EP | 0079253 | 5/1983 |
| JP | 10 226 283 | 8/1998 |

\* cited by examiner

*Primary Examiner*—Walter Benson
*Assistant Examiner*—Jeremy Luks

(57) ABSTRACT

A vehicle cab noise suppressing system includes a cab interior panel having an opening exposed to acoustic noise in the cab, an acoustic resonator chamber, and a conduit communicating the resonator chamber to the opening. The resonator chamber is formed by a plurality of walls which are spaced apart from the interior panel and which are formed by a second panel. A third panel cooperates with the walls to enclose the resonator chamber. The chamber volume and the diameter and length of the conduit are chosen so as to acoustically tune the chamber to a noise frequency in the cab and thereby reduce noise in the cab.

6 Claims, 6 Drawing Sheets

VEHICLE CAB NOISE SUPPRESSING SYSTEM

BACKGROUND

The present invention relates to a vehicle cab noise suppression system.

Many off-road vehicles have cabs which enclose a certain volume, and the enclosed volume will have an acoustic resonance which causes a "booming" noise. Such a noise is annoying to vehicle operators and can reduce operator productivity.

Resonators have been used with exhaust mufflers and combustion air intake systems which have a given sound frequency traveling through the muffler or intake tubes. When the noise reaches the resonator, the resonator reflects the noise back, preventing it from continuing down the system. This reduces exhaust noise and intake noise, and is used in mufflers and air intakes. In the construction field, large warehouses or buildings will have a slot in the cinder blocks of a wall and a volume behind the slot. This slot and volume acts as a resonator external to the volume where the noise is generated. This reduces the noise in the building. Heretofore, such techniques have not been applied to reduce noise in a vehicle cab.

SUMMARY

Accordingly, an object of this invention is to reduce or eliminate the booming noise in the cabs of off-road vehicles.

A further object of the invention is to provide a noise suppressing panel assembly provide which reduces acoustic resonance in the cab of off-road vehicles.

A further object of the invention is to provide a vehicle cab roof panel assembly which reduces acoustic resonance.

These and other objects are achieved by the present invention, wherein a vehicle cab noise suppressing system includes a cab interior panel having an opening exposed to acoustic noise in the cab, an acoustic resonator chamber, and a conduit communicating the resonator chamber to the opening. The resonator chamber is formed by a plurality of walls which are spaced apart from the interior panel and which are formed by a second panel. A cover panel cooperates with the walls to enclose the resonator chamber. The chamber has a volume and the conduit has a diameter and length which are chosen so as to acoustically tune the chamber to a noise frequency in the cab and thereby reduce noise in the cab. The interior panel is preferably a cab roof headliner. A trim cover is mounted in a depression in the interior panel which surrounds the opening.

DETAILED DESCRIPTION

Figure 1:
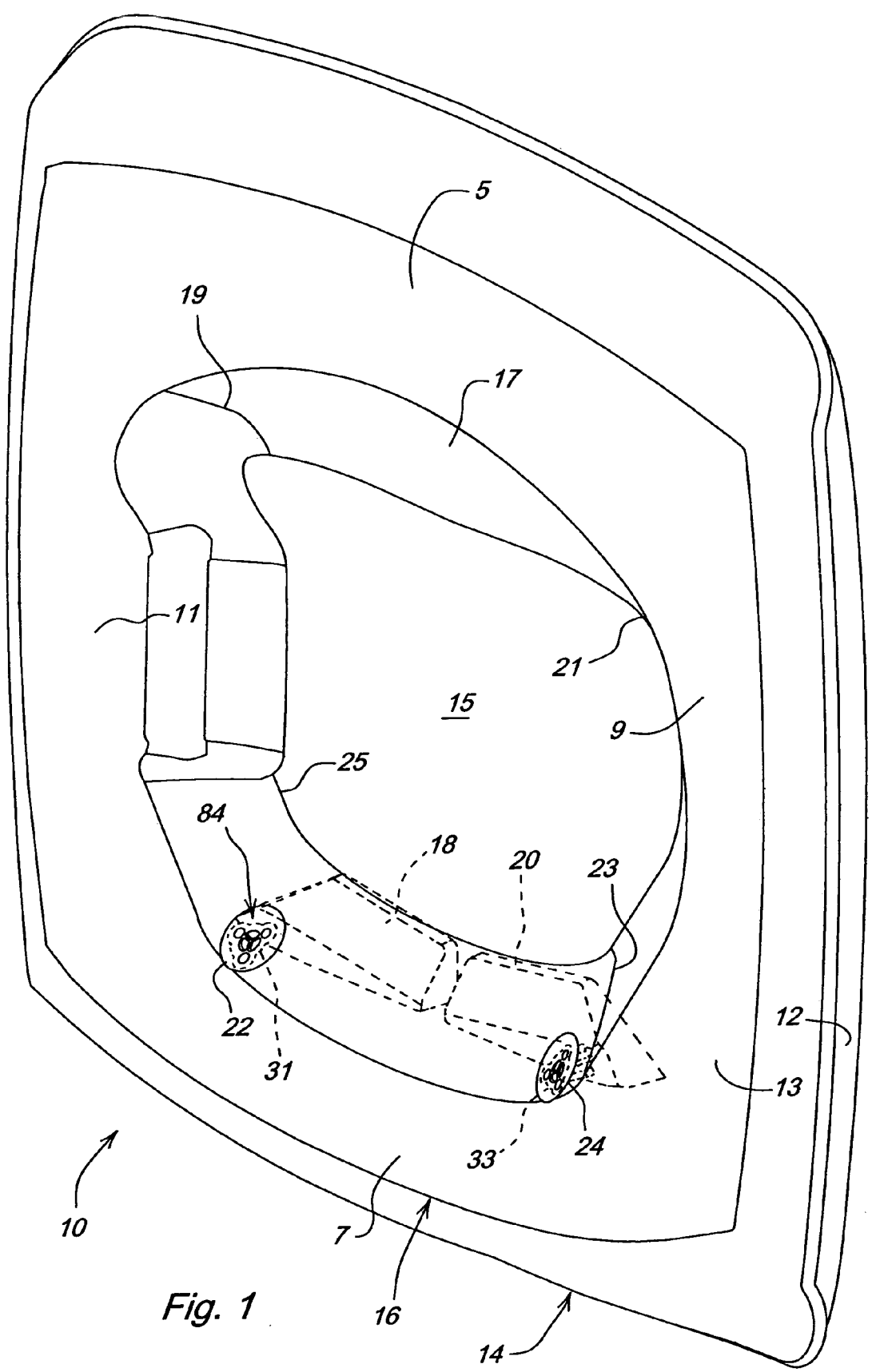
FIG. 1 is a perspective view of the underside of cab roof assembly including a noise suppression system according to the present invention.

Referring to FIG. 1, the cab roof assembly 10 includes a top roof housing 12 which covers an inner roof member 14. A head liner 16 is attached at its outer periphery to a lower surface of inner roof member 14. The head liner 16 includes a front portion 5, a rear portion 7, a left portion 9 and a right portion 11. Inner roof member 14 forms a pair of chambers 18 and 20 which in FIG. 1 are hidden behind the head liner 16. A pair of trim covers 22 and 24 are mounted in depressions formed in the head liner 16. The cab roof assembly 10, inner roof member 14 and head liner 16 all have generally rectangular shapes forming diagonally separated corners.

The headliner 16 includes an outer rim portion 13 defining a first surface, a central inner portion 15 defining a second surface which is spaced apart from the first surface, and a transition wall 17 which surrounds an outer edge of the inner portion 15 and joins the inner portion 15 to the outer portion 13. The transition wall 17 surrounds a generally rectangular-shaped recess with four side walls joined at four corners 19, 21, 23 and 25. The longest internal dimensions of the roof assembly 10 extend generally diagonally through opposite pairs of these corners. Openings 31 and 33 are formed in the transition wall 17 adjacent to corners 25 and 23, respectively, but in FIG. 1 these openings are hidden behind trim covers 22 and 24.

Figure 2:
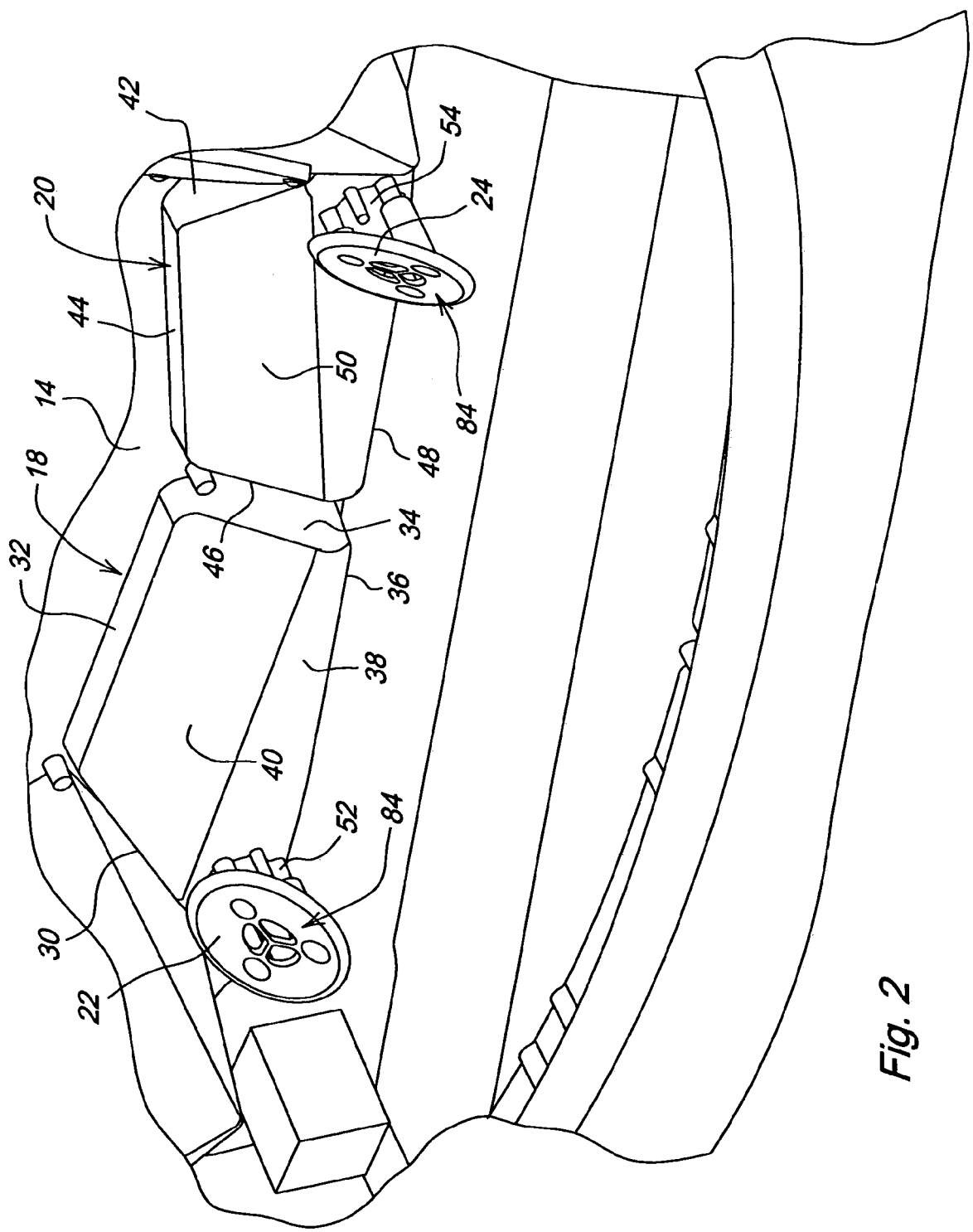
FIG. 2 is a perspective view of the underside of the cab roof assembly of FIG. 1 with the head liner removed.

As best seen in FIG. 2, inner roof member 14 forms a plurality of walls 30-40 which partially surround chamber 18. The inner roof member 14 also forms a plurality of walls 42-50 which partially surround chamber 20. The inner roof member 14 also forms a hollow conduit 52 which extends from chamber 18 to trim cover 20, and a hollow conduit 54 which extends from chamber 20 to trim cover 24. Trim covers 20 and 24 each have a plurality of apertures 84 which communicate with the interior of the conduits 52 and 54.

Figure 3:
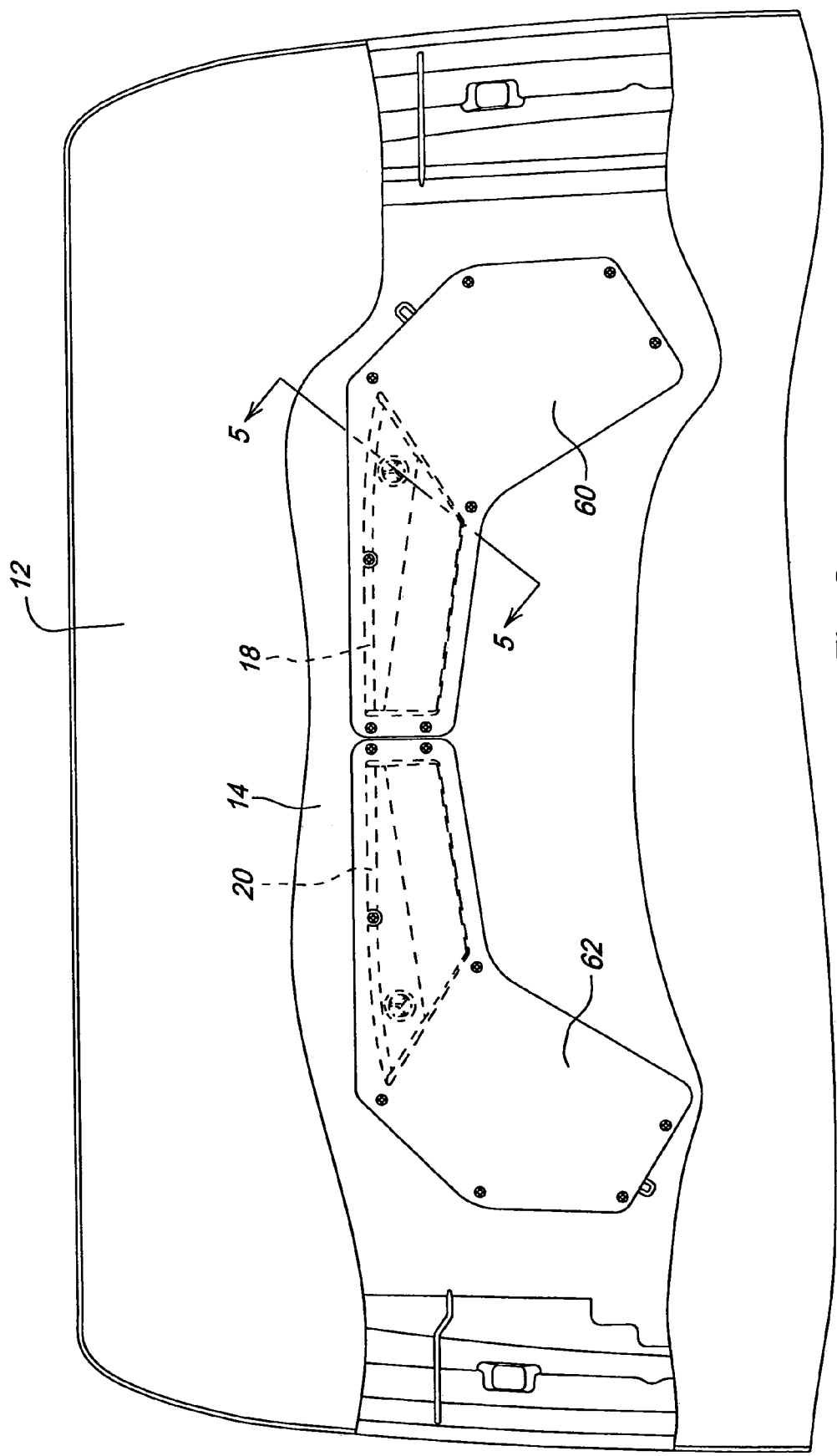
FIG. 3 is a partial cut-away top view of the cab roof assembly of FIG. 1.
Figure 4:
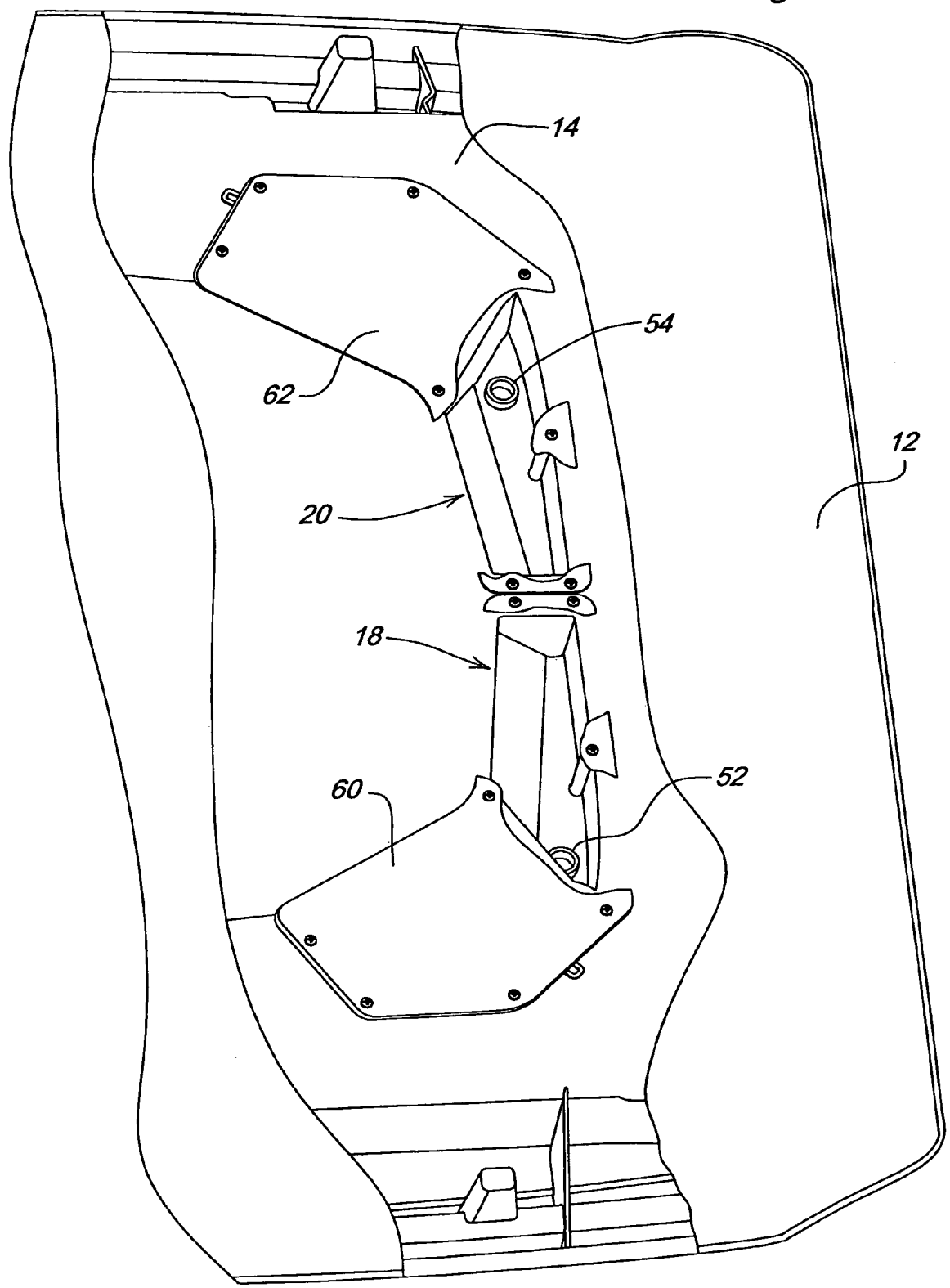
FIG. 4 is a view similar to FIG. 3, but with portions of the cover panels removed.

Referring now to FIGS. 3 and 4, the chambers 18 and 20 are covered by respective cover panels 60 and 62 which are attached to the upper surface of inner roof member 14.

Figure 5:
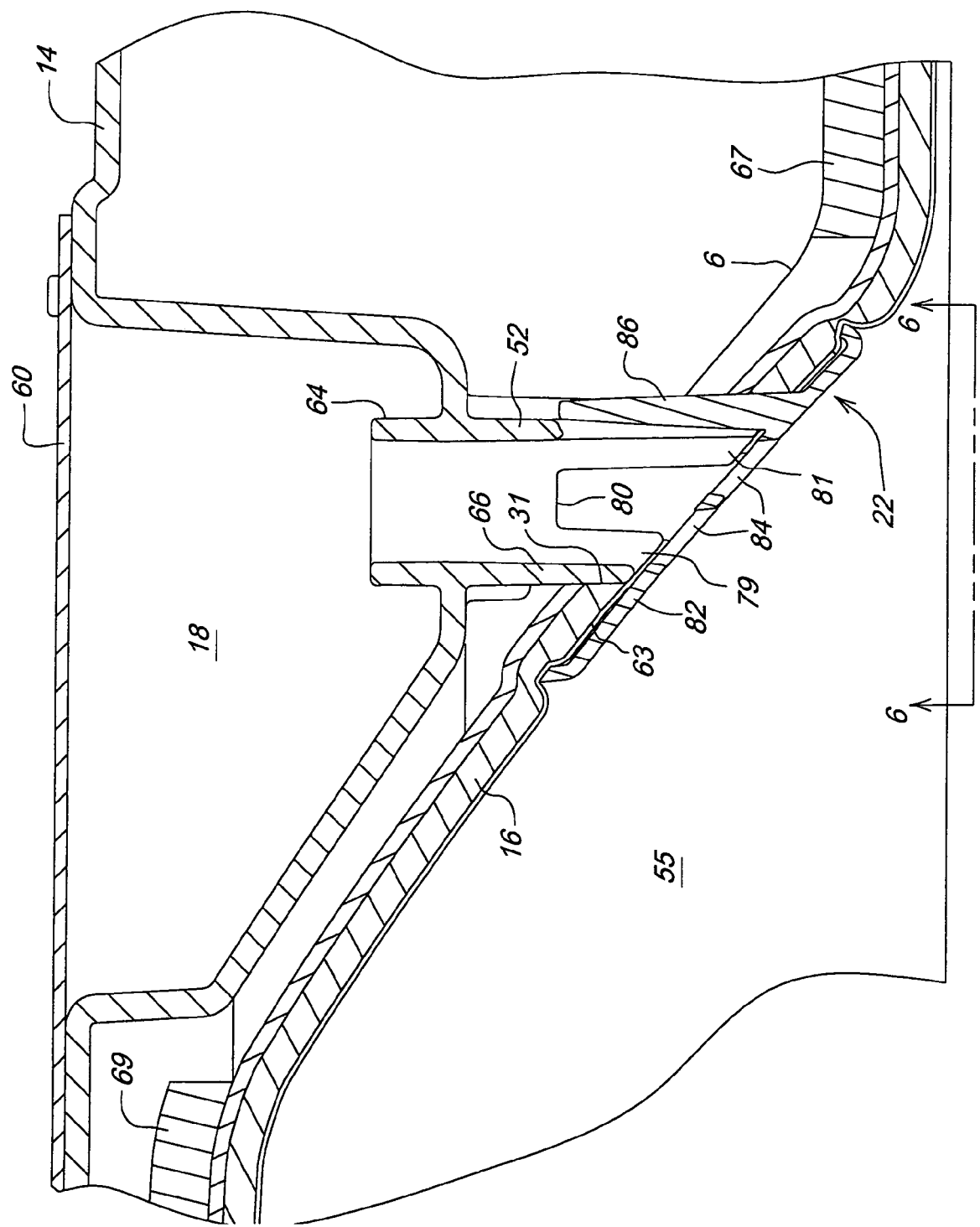
FIG. 5 is a perspective view along lines 5-5 of FIG. 3.

As best seen in FIG. 5, the conduit 52 includes an inner portion 64 which projects into chamber 18 and an outer portion 66 which projects out of chamber 18. The head liner 16 includes a depression 63 which surrounds opening 31 which receives an outer end of the conduit 52 and which receives a portion of the trim cover 22.

Figure 6:
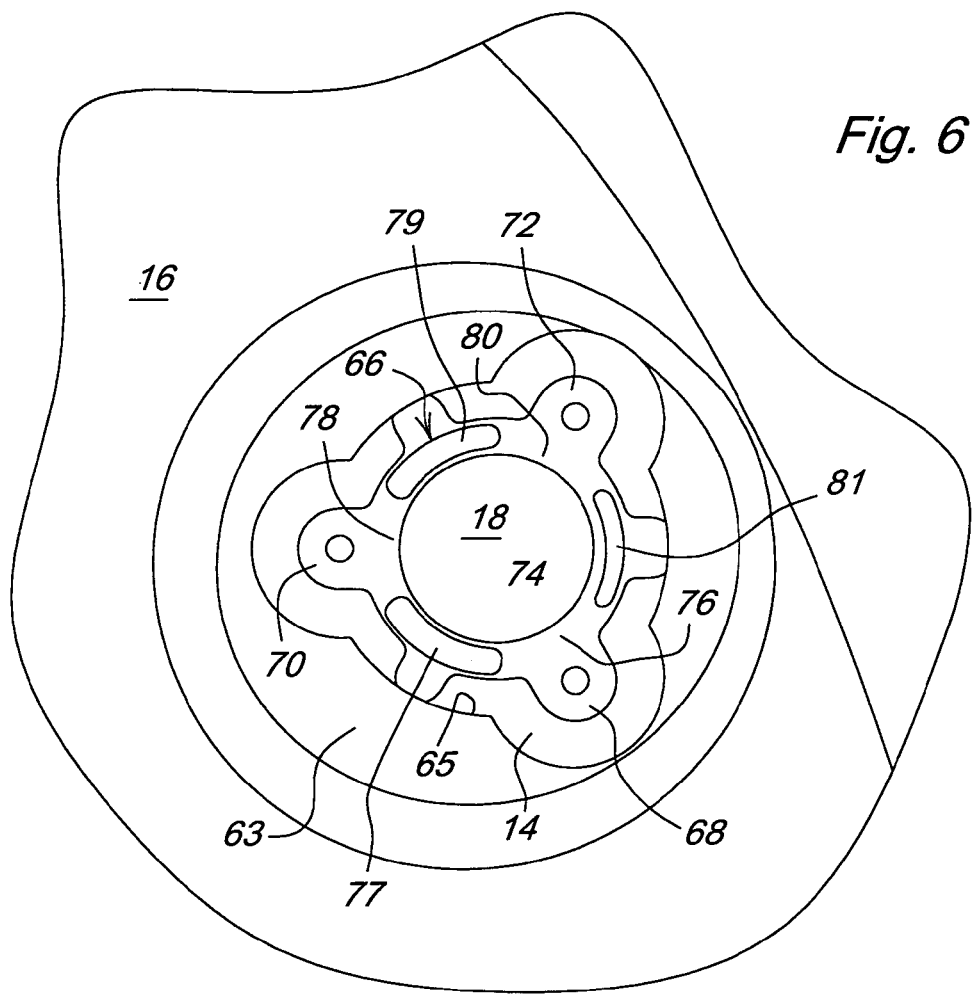
FIG. 6 is a view in the direction of lines 6-6 of FIG. 5 with the trim cover removed for clarity.

As best seen in FIG. 6, inner roof member 14 forms three axially extending mounting bosses 68, 70 and 72 which are spaced around the periphery of a bore 74 which extends through conduit 52. Inner roof member 14 also forms three slots 76, 78 and 80 in the conduit 52, each of which is positioned adjacent a corresponding one of bosses 68, 70 and 72. The slots are separated by finger 77, 79 and 81. The head liner 16 is lined with pads 67 and 69 of sound absorbing material.

Figure 7:
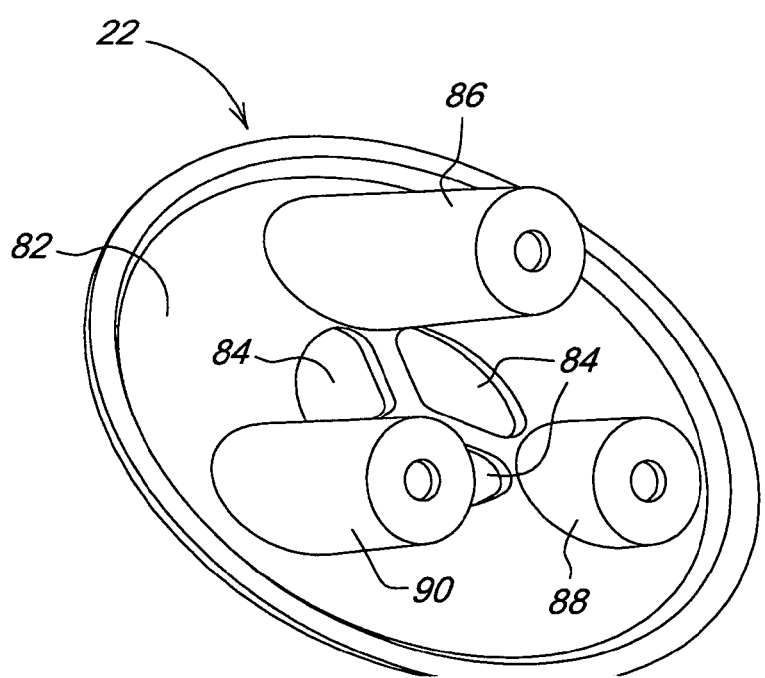
FIG. 7 is a back side perspective view of the trim cover of FIG. 5.

As best seen in FIGS. 5 and 7, trim cover 22 includes a circular head 82 with a plurality of apertures 84 formed therein, and hollow mounting posts 86, 88 and 90 which project from the rear side of head 82. The trim cover 22 is attached to the bosses 68-72 by screws (not shown) which extend through the mounting posts 86-90 and into the bosses 68-72. The head liner 16, the apertures 84, openings 31 and 33 are exposed to acoustic noise in the interior 55 of the cab (not shown). Preferably, the apertures 84 are large enough so that they do not completely restrict the air from moving into and out of the chambers 18 and 20.

The chambers 18 and 20 operate as acoustic resonators which are acoustically connected to an interior of the head liner 16 via the conduits 52 and 54, the openings 31 and 33 in the head liner 16 and the apertures 84 in the respective trim covers 22 and 24. Each chamber acts like a Helmholtz resonator which interacts with acoustic noise modes of a vehicle cab. The volume of chambers 18 and 20 and the diameter and length of the conduits 52 and 54 are chosen so as to "tune" the resonator to a noise frequency in the cab. The chambers are preferably located behind the head liner 16 to the left and right of the operator's head. Preferably, so as to best suppress noise under the cab roof assembly 10, the trim covers 22 and 24 and the associated openings 31 and 33 are located near the corners 19-25 and adjacent to lines which connect opposite corners of the roof assembly 10. A pair of such resonators have shown a reduction in cab "booming" noise of 3 to 5 decibels at a 100 Hz frequency.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A vehicle cab noise suppressing system, comprising:
   a cab interior panel having a generally rectangular shape forming diagonally separated corners, the cab interior panel having a pair of openings exposed to acoustic noise in the cab, and the openings being located adjacent lines connecting opposite pairs of said corners;
   a pair of acoustic resonator chambers; and
   a pair of conduits, each communicating one of the resonator chambers to the corresponding opening, the interior panel comprises a cab roof headliner having an outer rim portion defining a first plane, a central inner portion defining a second plane which is spaced apart from the first plane, and a transition wall which surrounds an outer edge of the inner portion and joins the inner portion to the outer portion, and the openings are formed in the transition wall.

2. The noise suppressing system of claim 1, comprising:
   a second panel having a plurality of walls which are spaced apart from the interior panel;
   a third panel cooperating with the walls to enclose the resonator chamber.

3. The noise suppressing system of claim 1, further comprising:
   a trim cover mounted in the opening of the interior panel.

4. The noise suppressing system of claim 3, wherein:
   the trim cover includes an aperture which communicates sound through it to the conduit.

5. The noise suppressing system of claim 1, wherein:
   the interior panel comprises a depression surrounding the opening; and
   a trim cover is mounted in the depression.

6. The noise suppressing system of claim 1, wherein:
   the interior panel forms a recess having a generally rectangular shape with diagonally separated corners; and
   the opening and the conduit are located adjacent to one of the corners.

* * * * *